(12) United States Patent
Haase et al.

(10) Patent No.: US 10,802,225 B2
(45) Date of Patent: Oct. 13, 2020

(54) INSPECTION DEVICE FOR OPTICAL CONNECTOR

(71) Applicant: 3M INNOVATIVE PROPERTIES COMPANY, St. Paul, MN (US)

(72) Inventors: Michael A. Haase, St. Paul, MN (US); Bing Hao, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/237,872

(22) Filed: Jan. 2, 2019

(65) Prior Publication Data

US 2019/0212500 A1 Jul. 11, 2019

Related U.S. Application Data

(60) Provisional application No. 62/614,532, filed on Jan. 8, 2018.

(51) Int. Cl.
*G02B 6/38* (2006.01)
*G01M 11/00* (2006.01)

(52) U.S. Cl.
CPC ............. *G02B 6/385* (2013.01); *G01M 11/33* (2013.01)

(58) Field of Classification Search
CPC . G01M 11/33; G02B 6/26; G02B 6/36; G02B 6/385
USPC .................. 356/135, 237.1–237.6, 301, 369, 356/399–401, 601–626
See application file for complete search history.

(56) References Cited

U.S. PATENT DOCUMENTS

| 5,724,127 A | * | 3/1998 | Csipkes | ................. G01M 11/31 356/73.1 |
| 2015/0092043 A1 | * | 4/2015 | Baribault | ............. G02B 7/1822 348/125 |
| 2016/0170151 A1 | * | 6/2016 | Baribault | ............... G02B 6/381 356/73.1 |

FOREIGN PATENT DOCUMENTS

| WO | WO 2014-055226 | 4/2014 |
| WO | WO 2017-066135 | 4/2017 |
| WO | WO 2017-066137 | 4/2017 |
| WO | WO 2018-116135 | 6/2018 |

OTHER PUBLICATIONS

Hecht. Optics: 4th Edition, San Francisco: Pearson Education, 2002 pp. 189-190 (Year: 2002).*

* cited by examiner

*Primary Examiner* — Colin W Kreutzer
(74) *Attorney, Agent, or Firm* — Robert S. Moshrefzadeh

(57) ABSTRACT

An inspection device for an optical ferrule includes one or more reflectors. Each reflector has a mating surface and a mirror disposed at an oblique angle with respect to the mating surface. Each reflector is configured to mate with the optical ferrule when the optical ferrule is disposed within a housing of an optical connector. When the mating surface of the reflector is in mated contact with the mating surface of the optical ferrule, the mirror is positioned to provide a reflected view of at least a portion of a mating surface of the optical ferrule.

27 Claims, 6 Drawing Sheets

INSPECTION DEVICE FOR OPTICAL CONNECTOR

BACKGROUND

Optical connectors can be used for optical communications in a variety of applications including telecommunications networks, local area networks, data center links, and internal links in computer devices. Expanded optical beams may be used in connectors for these applications to provide an optical connection that is less sensitive to dust and other forms of contamination and so that alignment tolerances may be relaxed. The optical connector is generally considered an expanded beam connector if there is an expanded beam at a connection point. Generally, an expanded beam is a beam that is larger in diameter than the core of an associated optical waveguide (usually an optical fiber, e.g., a multi-mode fiber for a multi-mode communication system). The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror.

BRIEF SUMMARY

Some embodiments are directed to an inspection device for an optical ferrule. The inspection device includes one or more reflectors. Each reflector has a mating surface and a mirror disposed at an oblique angle with respect to the mating surface. The reflector is configured to mate with the optical ferrule when the optical ferrule is disposed within a housing of an optical connector. When the mating surface of the reflector is in mated contact with the mating surface of the optical ferrule, the mirror is positioned to provide a reflected view of at least a portion of a mating surface of the optical ferrule.

In some embodiments, an inspection system includes an inspection device as described above and an imaging system configured to image the reflected view provided by the mirror of each mating reflector.

A method of inspecting an optical ferrule includes mating one or more optical ferrules disposed within a housing of an optical connector respectively with one or more reflectors of an inspection device. Each reflector includes a mating surface and a mirror disposed at an oblique angle with respect to the mating surface. The mating of the optical ferrule with a reflector causes the mating surface of the reflector to contact a mating surface of the optical ferrule. The mating causes the optical ferrule to rotate around a lateral axis perpendicular to a mating axis of the optical connector. Light is reflected from the mirror of the reflector. The reflected light provides a reflected view of at least a portion of the mating surface of the optical ferrule.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Optical ferrules have optical windows (output surfaces) that allow the signal light to pass between an optical ferrule and a mating optical ferrule. The expanded-beam optical ferrules discussed herein have an optical window disposed on the mating surface of the ferrule. Through use and environmental exposure, the optical windows of the ferrules can become damaged by scratches and/or may collect dust particles. The performance of the optical connectors is diminished when the optical window is scratched and/or occluded by dust. Additionally, the optical ferrules can be sensitive to angular errors that occur when dust particles disposed on the mating surface tilt the optical ferrule by an angle on the order of 0.1 degrees. As an example, the planar interface between ferrules of an optical connector of the present disclosure can be about 3 mm long. If a single 50 µm diameter dust particle is trapped in the interface between two mated light coupling units, the dust particle would generate an angular error of 1 degree or larger, thereby decreasing optical transmission efficiency.

Embodiments described herein are directed to an inspection device for optical connectors that include optical ferrules. The inspection device allows the end user of an optical connector to check for damage to the ferrules and/or for the presence of dust on the ferrules.

Figure 1:
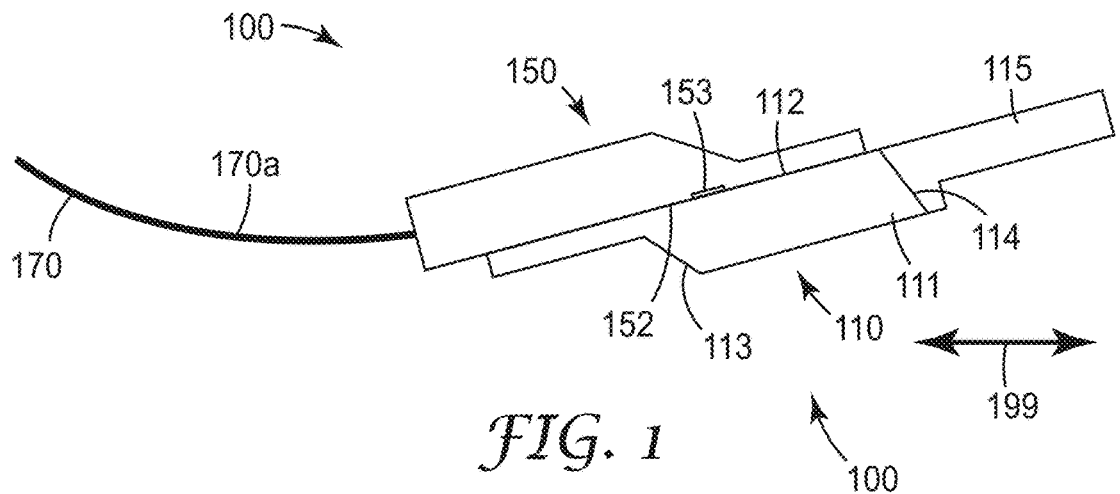
FIG. 1 is a diagram illustrating a side view of an optical cable subassembly and an inspection device in accordance with some embodiments.

FIG. 1 is a diagram illustrating a side view of an optical cable subassembly 160 and an inspection device 100 in accordance with some embodiments. The optical cable subassembly includes an optical ferrule 150 and at least one optical waveguide 170 attached to the optical ferrule 150. The inspection device 100 includes one or more reflectors 110. Each reflector 110 comprises a mating surface 112 configured to mate with a mating surface 152 of the ferrule 150. The reflector 110 includes a mirror 113 disposed at an oblique angle with respect to the mating surface 112 of the reflector 110. In some implementations the reflector 110 including the mirror 113 may be a molded article. The mirror 113 can be coated or uncoated. The mirror 113 may be a total internal reflection (TIR) reflector. In various implementations, the mirror 113 may comprise a metallic coating, e.g., an Al coating, an interference coating, a cleaved surface, and/or a polished surface, for example. The mirror 113 may have a curved surface. For example, the curvature of the mirror can slightly magnify or de-magnify the image. The curvature of the mirror may be intentionally designed for use with a particular imaging system. In some embodiments, the oblique angle between the mirror 113 and the mating surface is a range of about 30 degrees to about 150 degrees. For example, the oblique angle may be about 30 degrees, 45 degrees, 60 degrees, 90 degrees, 120 degrees, 135, or 150 degrees.

Optionally, the reflector 110 includes a tab 115 that extends from the reflector 110 and facilitates positioning the reflector 110 relative to the optical ferrule 150 to provide the reflected view of the optical window and/or ferrule mating surface.

When the reflector 110 and the optical ferrule 150 are mated, the mating surface 112 of the reflector 110 is in contact with a mating surface 152 of the optical ferrule 150. A bend 170a in the optical waveguide 170 provides a mating spring force that maintains the optical ferrule 150 in a mating arrangement with the reflector 110. The mirror 113 of the reflector 110 is positioned to provide a reflected view of at least a portion of mating surface 152 of the optical ferrule 150. In some embodiments, the reflected view provided by the mirror 113 includes a reflected view of an optical window 153 disposed in the mating surface 152 of the optical ferrule 150. In some embodiments, the reflected view provided by the mirror 113 includes a reflected view of the optical window 153 and an area of the mating surface 152 of the optical ferrule 150 proximate to the optical window 153.

The reflector 110 includes a viewing surface 114 spaced apart from the mirror 113. The viewing surface 114 is configured to transmit light reflected by the mirror 113, e.g., toward a microscope (not shown in FIG. 1). The reflector 110 may include a transparent extension portion 111 extending between the mirror 113 and the viewing surface 114. In some embodiments, the viewing surface 114 may be configured to refract the light reflected by the mirror 113. Refraction of the light may be useful when the inspection device is used with a microscope as discussed in more detail below. For example, the viewing surface 114 may be angled, e.g., disposed at an oblique angle with respect to the mating surface 112 of the reflector 110, so that the image of the mating surface 152 of the optical ferrule 150 can be viewed along a mating axis 199 of a connector housing that contains the optical cable assembly 160. In some embodiments, the oblique angle between the viewing surface 114 and the mating surface 112 of the reflector 110 may range between about 45 degrees to about 135 degrees, for example.

Figure 2:
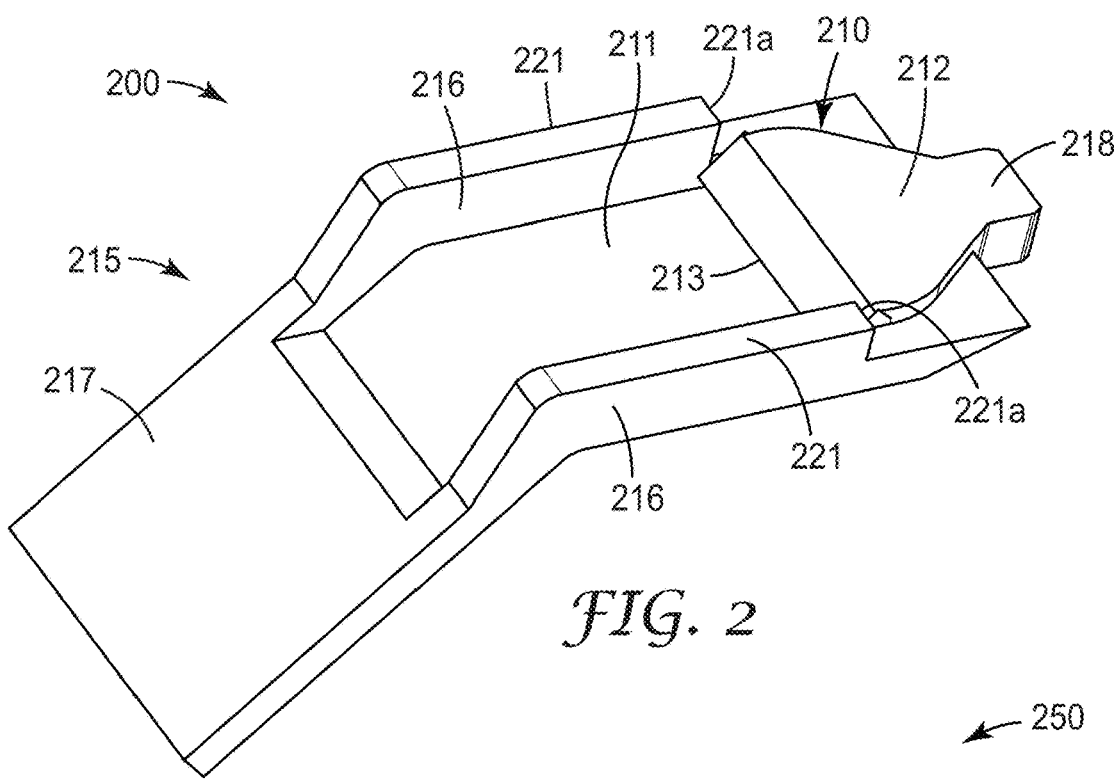
FIG. 2 is a perspective view of an inspection tool in accordance with some embodiments.
Figure 3:
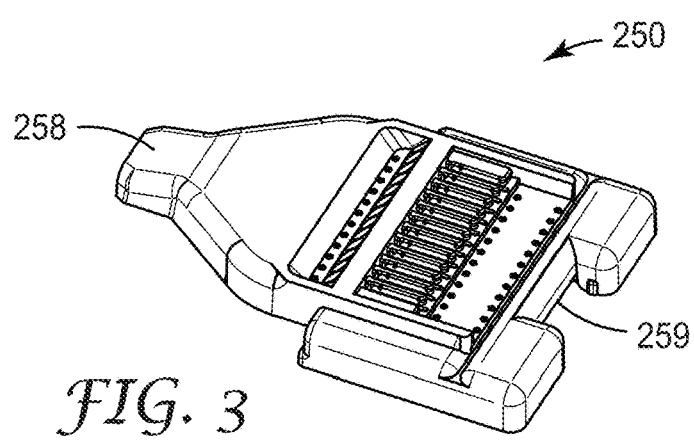
FIG. 3 is a perspective view an optical ferrule that can be inspected by the inspection tool of FIG. 2.

FIG. 2 is a perspective view of an inspection device 200 in accordance with some embodiments. FIG. 3 is a perspective view an optical ferrule 250 that can be inspected by the inspection device 200. The inspection device 200 includes a reflector 210 comprising a mating surface 212 on the reflector 210 and a mirror 213 disposed at an oblique angle with respect to the mating surface 212. The reflector 110 shown in FIG. 2 does not include a viewing surface. The reflector 210 has an opening 211 that extends from the mirror.

As shown in FIG. 2, the reflector 210 includes a tab 215 that extends from the reflector 210. The tab 215 is configured to facilitate insertion, removal, and positioning of the inspection device 200. As shown in FIG. 2, the tab 215 may include tab extensions 216 that extend from the reflector 210 on either side of the mirror 213. The tab 215 may further include a tab end 217 attached to the tab extensions 216.

As illustrated in FIGS. 2 and 3, the reflector 210 may include one or more alignment features, such as protrusion 218 which is configured to be received by a slot 259 of the optical ferrule 250. The reflector 210 may also include a slot (not shown in FIG. 2) which is configured to receive a protrusion 258 of the optical ferrule 250.

The reflector 210 can include left and right arms 221 disposed respectively at left and right sides of the reflector. The left and right arms restrict the movement of the optical ferrule 250 along a lateral axis perpendicular to the mating axis of the reflector 210 and ferrule 250. The arms 221 can include stop features 221a configured to restrict the movement of the reflector 210 along the mating axis.

Figure 4:
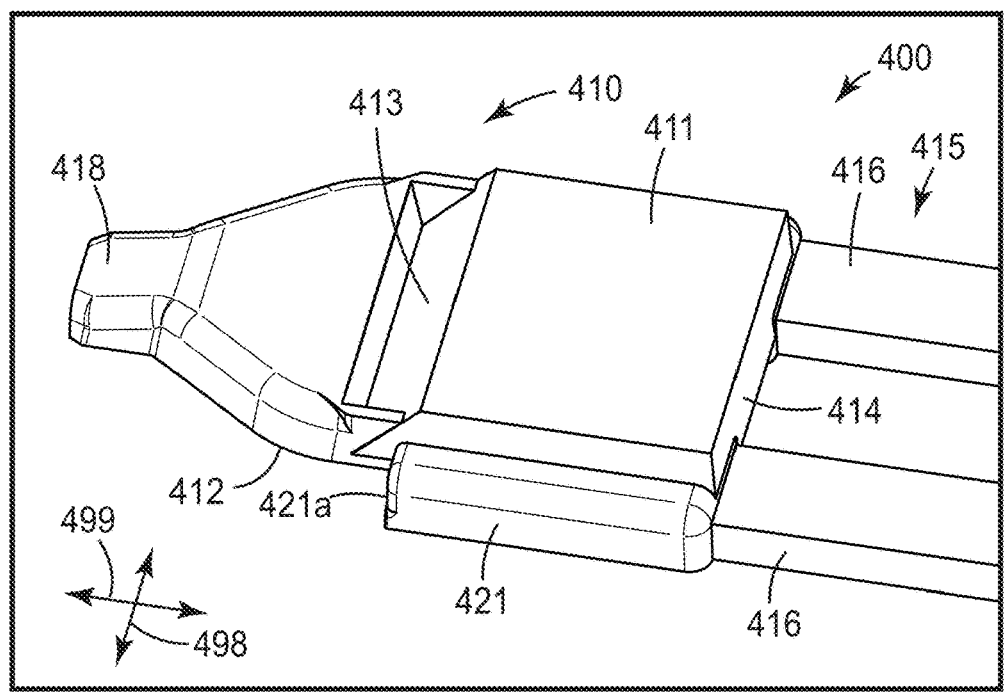
FIG. 4 provides a perspective view of an inspection device in accordance with some embodiments.

FIG. 4 provides a perspective view of an inspection device 400 in accordance with some embodiments. As depicted in FIG. 4, the inspection device 400 includes a reflector 410 comprising a mating surface 412 configured to mate with a mating surface of an optical ferrule (not shown in FIG. 4). The reflector 410 includes a mirror 413 disposed at an oblique angle with respect to the mating surface 412 of the reflector 410. Optionally, the reflector 410 includes a tab 415 that extends from the reflector 410 and facilitates positioning the reflector 410 relative to an optical ferrule to provide the reflected view of the optical window and/or ferrule mating surface.

When the reflector 410 and an optical ferrule are mated, the mirror 413 of the reflector 410 is positioned to provide a reflected view of at least a portion of mating surface of the optical ferrule. The reflected view provided by the mirror 413 may be a reflected view of an optical window of the optical ferrule or may be a reflected view of the optical window and a surrounding portion of the optical ferrule mating surface.

The reflector 410 includes a viewing surface 414 spaced apart from the mirror 413. The viewing surface 414 is configured to transmit light reflected by the mirror 413. In many embodiments, the inspection device is used with a microscope as discussed below. The light that passes through the viewing surface 414 is received by a microscope. As shown in FIG. 4, the reflector 410 may include an extension portion 411 extending between the mirror 413 and the viewing surface 414. In some embodiments, both the viewing surface 414 and the reflector 410 including the extension portion 411 are transmissive to light. The viewing surface 414 and the reflector 410 may be made of the same light transmissive material. In some embodiments, the viewing surface 414 is configured to refract the light reflected by the mirror 413. For example, the viewing surface 414 may be angled, e.g., disposed at an oblique angle with respect to the mating surface 412 of the reflector 410, so that the image of the mating surface of the optical ferrule can be viewed along a mating axis of a connector.

FIG. 4 illustrates a tab 415 that extends from the reflector 410. The tab 415 is configured to facilitate insertion, removal, and positioning of the inspection device 400. The tab 415 may include tab extensions 416 that extend from the reflector 410 on either side of the viewing surface 414. The tab 415 may further include a tab end (not shown) attached to the tab extensions 416.

As illustrated in FIG. 4, the reflector 410 may include one or more alignment features, such as protrusion 418 which is configured to be received by a receptacle of the optical ferrule. The reflector 410 may also include a receptacle (not shown in FIG. 2A) which is configured to receive a protrusion of the optical ferrule.

The reflector 410 can comprise arms 421 disposed respectively at opposing lateral sides of the reflector 410. One arm 421 is shown in FIG. 4. When the reflector 410 is mated with an optical ferrule, the arms 421 restrict the movement of the optical ferrule along a lateral axis 498 perpendicular to the mating axis 499 of the reflector 410 and ferrule. The arms 421 can include stop features 421a configured to restrict the movement of the reflector 410 along the mating axis 499.

Figure 5:
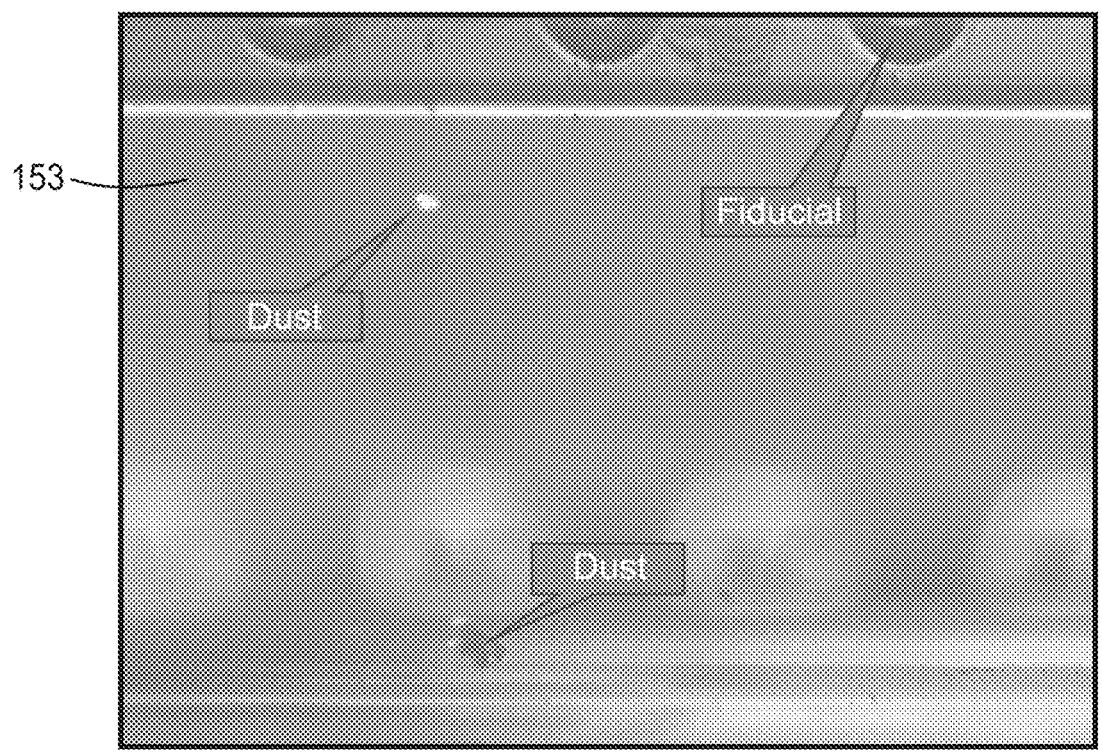
FIG. 5 is a photograph illustrating a reflected view of the optical window of a ferrule.

FIG. 5 is a photograph illustrating the reflected view of the optical window of a ferrule. As seen in FIG. 5, dust particles may collect on the ferrule's optical window diminishing the performance of the optical connector.

Figure 6:
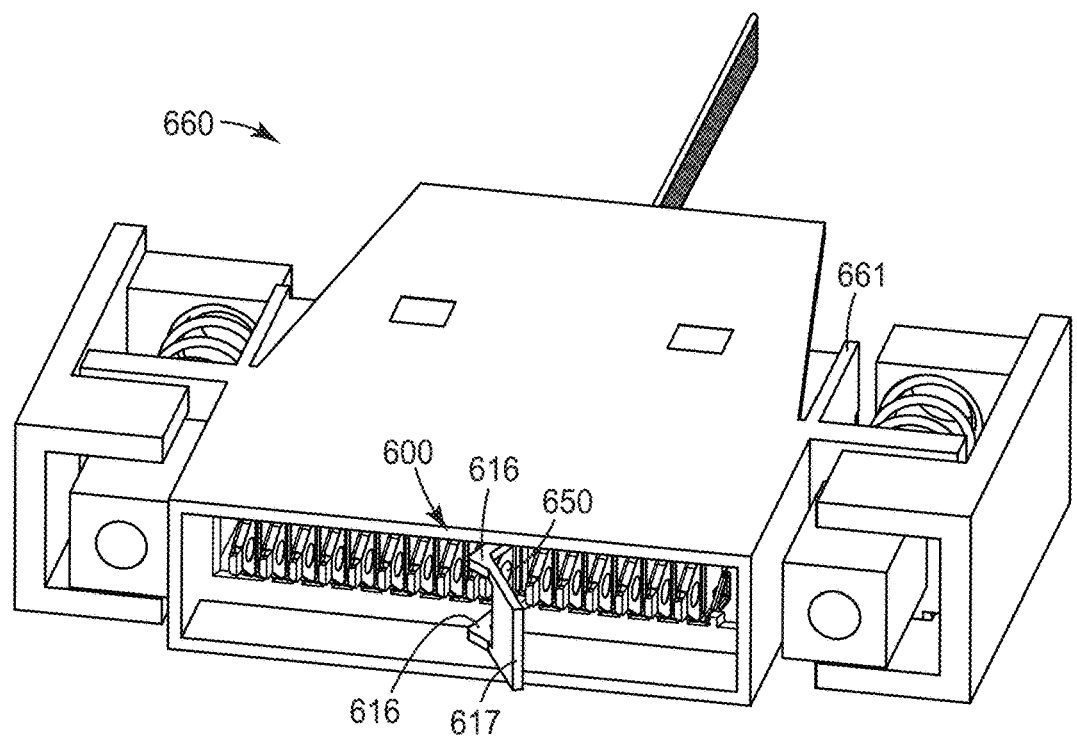
FIGS. 6 and 7 show different views an inspection device in accordance with some embodiments inserted into the housing of an optical connector and mated with an optical ferrule.
Figure 7:
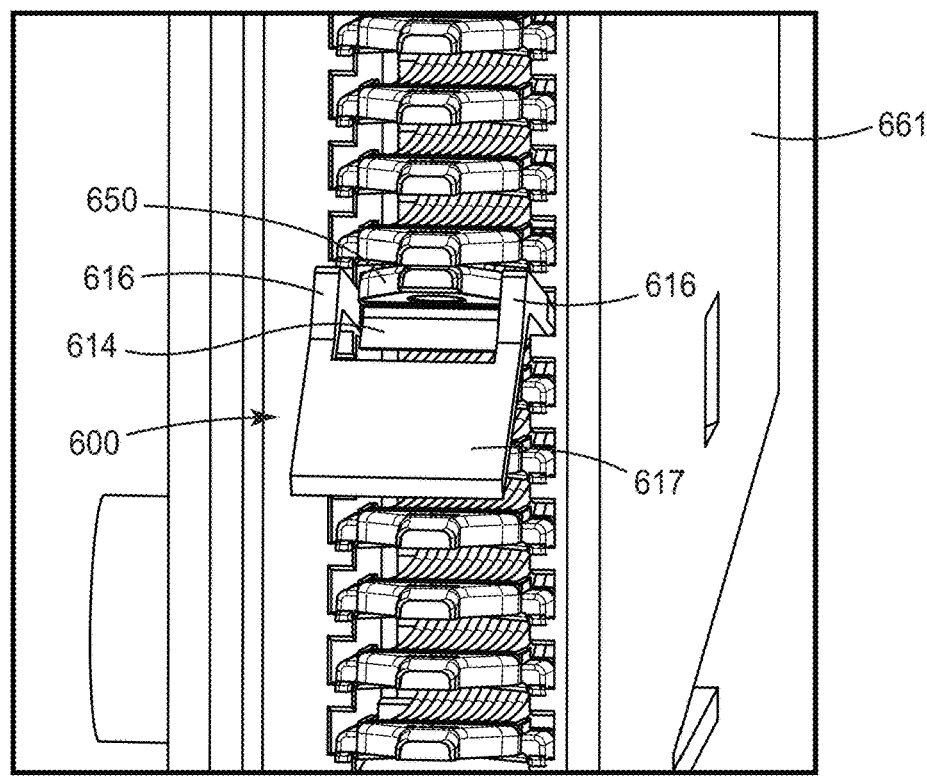

FIGS. 6 and 7 show an inspection device 600 inserted into the housing 661 of an optical connector 660 and mated with an optical ferrule 650. For example, in some embodiments, the inspection device 600 may have the general configuration of the device 400 depicted in FIG. 4. The inspection device 600 is shown in FIG. 6 extending from the housing 661 with the tab end 617 visible at the back of the inspection device 600. Also visible are the tab extensions 616 extending from the reflector of the inspection device.

FIG. 7 shows a view of the connector 660 from the point of view of looking into the housing 661. The viewing surface 614 of the inspection device 600 is visible in FIG. 7.

Figure 8:
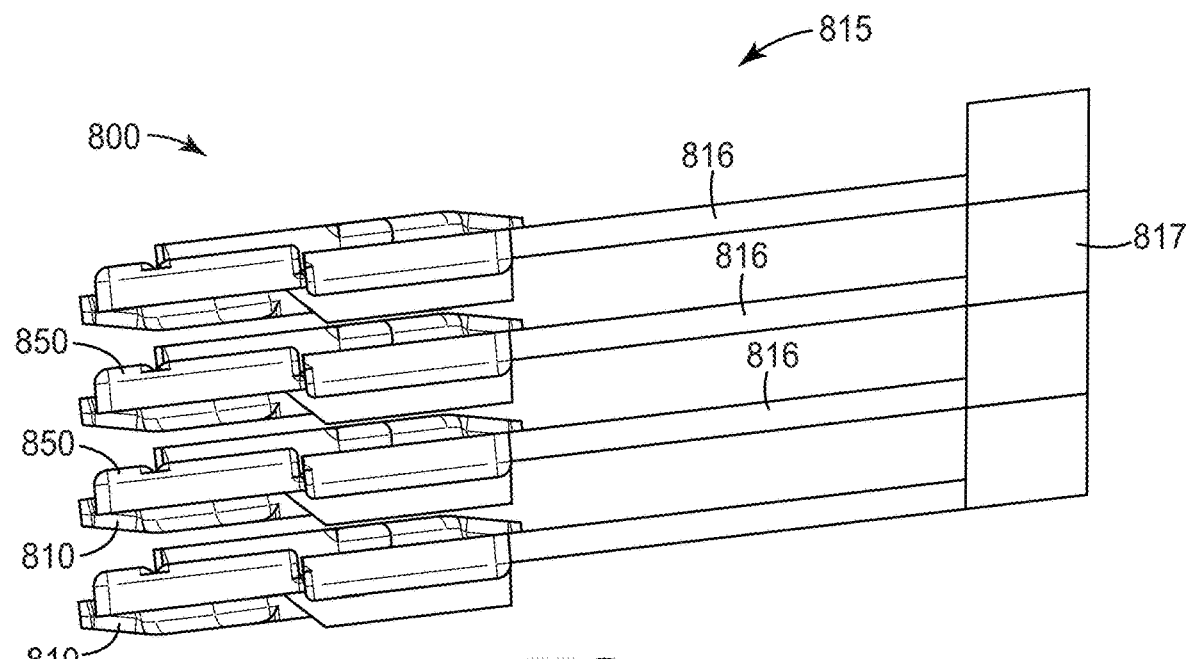
FIG. 8 is a side view of an inspection device comprising multiple reflectors in accordance with some embodiments.

In some embodiments, an inspection device comprises multiple reflectors, each reflector configured to mate with a corresponding optical ferrule and to provide for inspection of the optical ferrule. FIG. 8 is a side view of an inspection device 800 comprising multiple reflectors 810. In some embodiments, each of the reflectors 810 may have the general configuration of the reflector 410 depicted in FIG. 4. Each reflector 810 includes a tab 815 comprising a tab extension 816 that extends from the reflector 810 outwardly from the connector housing 861. In the embodiment shown in FIG. 8, all the tab extensions are joined by a common tab end 817.

Figure 9:
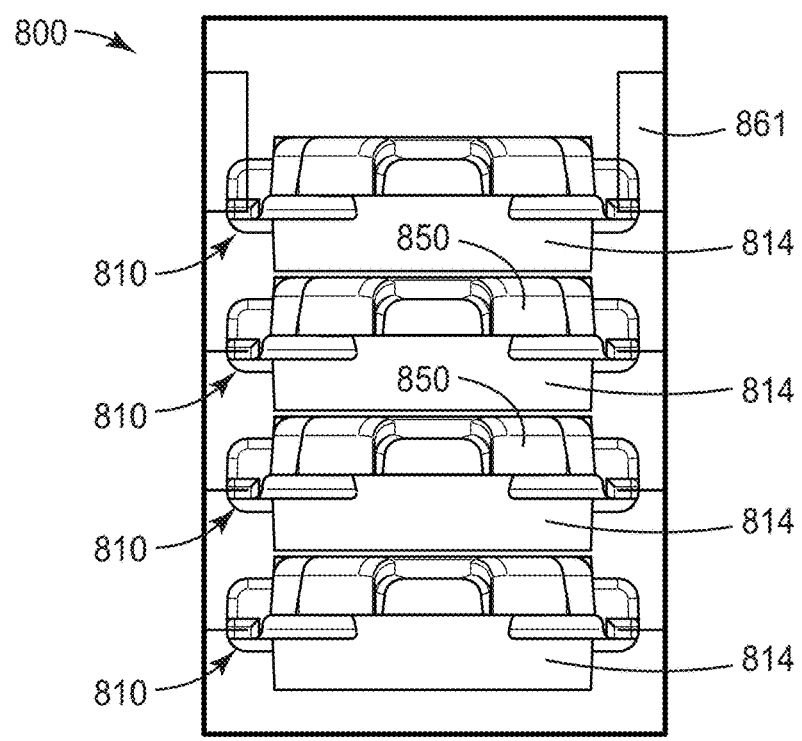
FIG. 9 shows a view of the inspection device of FIG. 8 inserted into an optical connector from the point of view of looking into the housing of the optical connector.

FIG. 9 shows a view of the inspection device 800 inserted into an optical connector from the point of view of looking into the housing 861 of the optical connector. Each reflector 810 is configured to mate with a corresponding optical ferrule 850 such that a reflected view of the optical window of the optical ferrule can be inspected. FIG. 9 shows the viewing surface 814 0f the inspection device. The viewing surface is configured to transmit the light reflected by the mirror of the inspection device's reflector.

Figure 10:
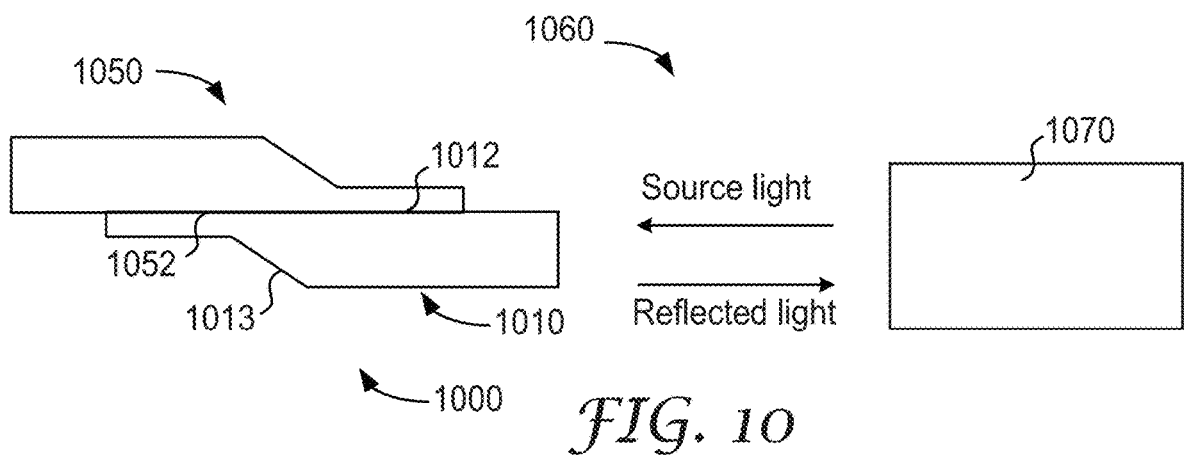
FIGS. 10 through 12 are conceptual diagrams of inspection systems that incorporate an inspection device in accordance with some embodiments.
Figure 11:
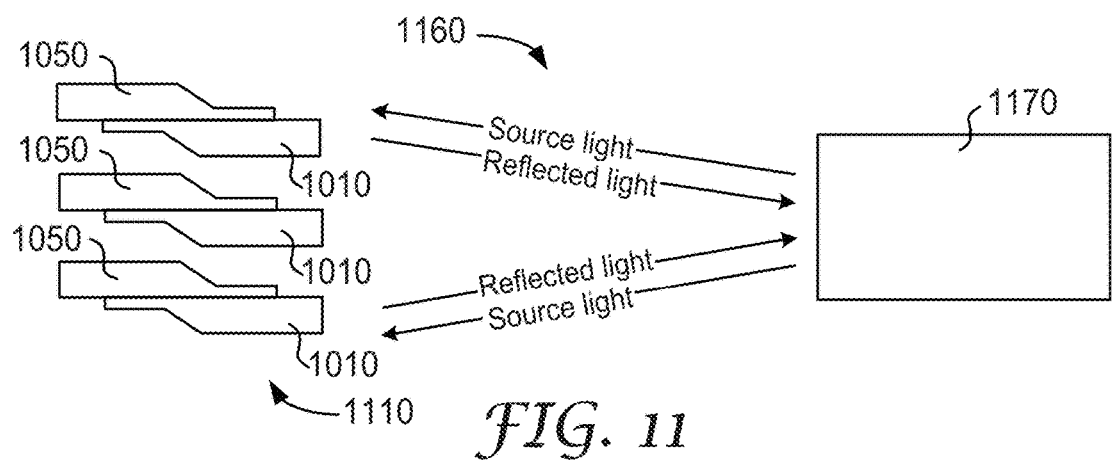
Figure 12:
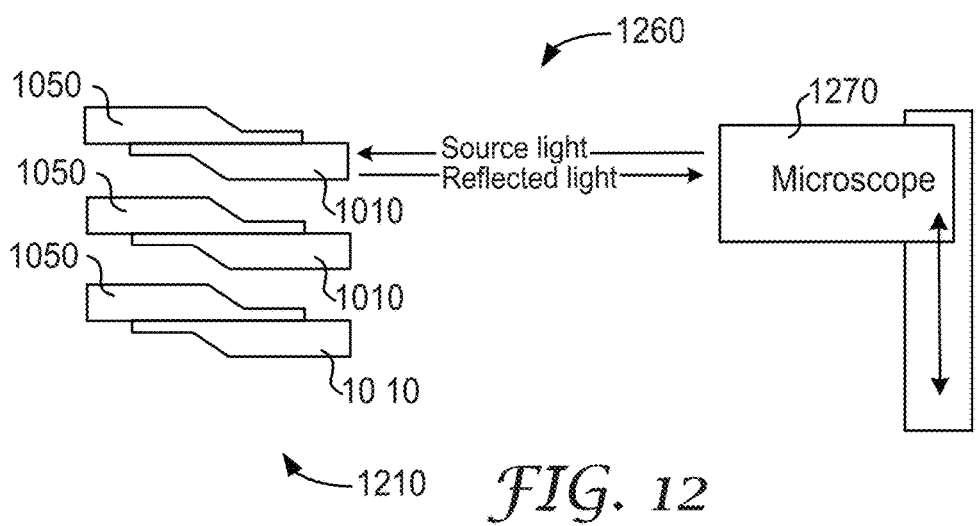

FIGS. 10 through 12 are conceptual diagrams of inspection systems 1060, 1160, 1260 in accordance with various embodiments. FIG. 10 shows an inspection system 1060 in which an inspection device 1000 comprises a reflector 1010 that is configured to mate with an optical ferrule 1050. The reflector 1010 includes a mirror 1013 disposed at an oblique angle with respect to the mating surface 1012 of the reflector. The mirror 1013 can be positioned to provide a reflected view of an output surface of the optical ferrule 1050 when the mating surface 1012 of the reflector 1010 is in contact with the mating surface 1052 of the optical ferrule 1050. The inspection system 1060 includes an imaging system 1070, such as a microscope, arranged to image the reflected view of the mirror 1013. For example, the imaging system 1070 may be arranged to provide source light to the inspection device 1000 and to receive the light reflected by the mirror 1013 of the reflector 1010.

FIGS. 11 and 12 are conceptual diagrams of inspection systems 1160, 1260 which incorporate an inspection device 1110, 1210 comprising multiple reflectors 1010 that are substantially similar to the reflector shown in FIG. 10. Each reflector 1010 of the inspection device 1110, 1210 has a mating surface 1012 configured to slidably engage with a mating surface 1052 of the optical ferrule 1050.

As illustrated in FIG. 11, in some implementations, the imaging system 1170 is arranged to simultaneously receive the light reflected by the mirrors 1013 of multiple reflectors 1010 as indicated in FIG. 11. Alternatively, as depicted in FIG. 12, the imaging system 1270 may be configured to sequentially scan the light reflected by the mirrors 1013 of multiple reflectors 1010 in time. For example, the scanning may be implemented by moving the microscope 1270, either automatically or manually, such that the microscope 1270 sequentially receives the reflected light from each of the mirrors 1013 of the reflectors 1010. Alternatively, the scanning may be implemented by a mirror array that directs the source light from the microscope to each reflector in a time sequence and/or directs the reflected light from each reflector in time sequence to the microscope.

Figure 13:
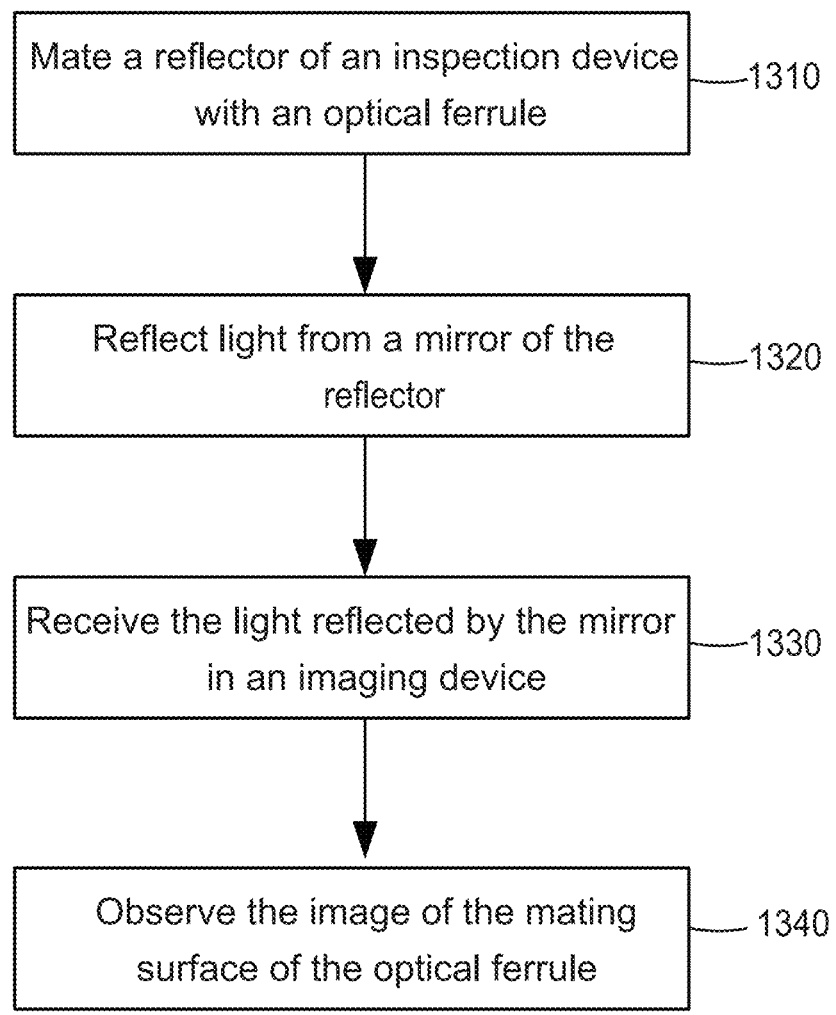
FIG. 13 is a flow diagram illustrating a method for inspecting optical ferrules of an optical connector in accordance with some embodiments.

FIG. 13 is a flow diagram illustrating a method for inspecting optical ferrules of an optical connector. The method includes mating 1310 one or more optical ferrules disposed within a housing of an optical connector with an inspection device comprising one or more reflectors. Each optical ferrule is attached to at least one optical waveguide. Each reflector includes a mating surface and a mirror disposed at an oblique angle with respect to the mating surface. The mating of each optical ferrule with a reflector causes the mating surface of the reflector to contact a mating surface of the optical ferrule. Mating of the optical ferrule to the reflector causes the optical ferrule to rotate around a lateral axis perpendicular to a mating axis of the optical connector. The spring force provided by the optical waveguide maintains mating contact between the ferrule and the reflector. Source light is reflected 1320 by the mirror, the reflected light provides a reflected view of the mating surface of the optical ferrule. The light reflected by the mirror can be received 1330 in an imaging system so that the image can be displayed to a user. The inspection process allows the user to observe 1340 the image of the optical window and/or surrounding areas of the mating surface of the optical ferrule for the presence of dust, scratches, and/or other evidence of degradation.

Items described in this disclosure include:

Item 1. An inspection device comprising:
    one or more reflectors each reflector comprising:
    a mating surface on the reflector; and
    a mirror disposed at an oblique angle with respect to the mating surface, wherein the reflector is configured to mate with an optical ferrule disposed within a housing of an optical connector such that the mating surface of the reflector is in contact with a mating surface of the optical ferrule and the mirror is positioned to provide a reflected view of at least a portion of a mating surface of the optical ferrule.

Item 2. The device of item 1, wherein the reflected view includes a reflected view of an optical window disposed in the mating surface of the optical ferrule.

Item 3. The device of any of items 1 through 2, wherein the reflector includes a viewing surface spaced apart from the mirror, the viewing surface configured to transmit light reflected by the mirror.

Item 4. The device of item 3, wherein between the mirror and the viewing surface, the reflector comprises a material that is substantially transparent to the light reflected by the mirror.

Item 5. The device of item 3, wherein the viewing surface is configured to refract the light reflected by the mirror.

Item 6. The device of item 3, wherein the viewing surface is angled such that the image of the mating surface can be viewed along a mating axis of the optical connector housing.

Item 7. The device of item 3, wherein the viewing surface is disposed at an oblique angle with respect to the mating surface such that the viewing surface refracts the light redirected by the mirror.

Item 8. The device of any of items 1 through 7 further comprising a tab extending from the reflector and configured to facilitate insertion of the inspection device into the optical connector and removal of the inspection device from the optical connector.

Item 9. The device of item 8, wherein the tab includes first and second tab extensions that respectively extend on either side of the viewing surface.

Item 10. The device of item 8, wherein the tab includes first and second tab extensions that respectively extend on either side of the mirror.

Item 11. The device of item 8, wherein the tab includes:
 tab extensions that extend from the reflector; and
 a tab end attached to the tab extensions.

Item 12. The device of any of items 1 through 11, wherein the reflector comprises at least one first alignment feature configured to engage with a second complementary alignment feature of the optical ferrule.

Item 13. The device of item 12, wherein:
 the first alignment feature comprises a protrusion; and
 the second complementary alignment feature comprises a receptacle.

Item 14 The device of item 12, wherein:
 the first alignment feature comprises a receptacle; and
 the second complementary alignment feature comprises a protrusion.

Item 15. The device of any of items 1 through 14, wherein the reflector includes one or more stop features configured to restrict movement of the reflector along a mating axis.

Item 16. The device of any of items 1 through 15, wherein the reflector includes left and right arms disposed respectively at left and right sides of the reflector, wherein the left and right arms are configured to restrict movement of the optical ferrule along a lateral axis perpendicular to a mating axis of the reflector and the optical ferrule.

Item 17. The device of any of items 1 through 16, wherein movement of the reflector is restricted along a lateral axis perpendicular to a mating axis of the mating reflector and the optical ferrule by arms of the optical ferrule.

Item 18. The device of item 17, wherein the arms include stop features configured to restrict movement of the reflector along the mating axis.

Item 19. The device of any of items 1 through 18, wherein the device includes multiple reflectors, each reflector configured to mate with a different optical ferrule disposed within the housing of the optical connector.

Item 20. The device of any of items 1 through 19, wherein the mirror is a total internal reflection (TIR) mirror.

Item 21. The device of any of items 1 through 20, wherein the mirror comprises at least one of:
 a metallic coating;
 an aluminum coating;
 an interference coating;
 a polished surface;
 a cleaved surface;
 a curved surface; and
 an uncoated surface.

Item 22. The device of any of items 1 through 21, wherein the oblique angle between the mirror and the mating surface is in a range of about 30 degrees to about 60 degrees.

Item 23. The device of any of items 1 through 21, wherein the oblique angle between the mirror and the mating surface is about 45 degrees.

Item 24. The device of any of items 1 through 23, wherein the optical ferrule is attached to an optical cable and a bend in the optical cable provides a mating spring force that maintains the optical ferrule in a mating arrangement with the mating reflector.

Item 25. An inspection system comprising:
 an inspection device that includes one or more reflectors, each reflector comprising:
 a mating surface on the reflector; and
 a mirror disposed at an oblique angle with respect to the mating surface, wherein the mating reflector is configured to mate with an optical ferrule disposed within a housing of an optical connector such that the mating surface of the mating reflector is in contact with a mating surface of the optical ferrule and the mirror is positioned to provide a reflected view of an output surface of the optical ferrule; and
 an imaging system configured to image the reflected view provided by the mirror of each mating reflector.

Item 26. The inspection system of item 25, wherein the imaging system is configured to simultaneously receive the light reflected by the mirrors of multiple reflectors.

Item 27. The inspection system of item 25, wherein the imaging system is configured to sequentially receive the light reflected by mirrors of the multiple reflectors.

Item 28. A method of inspecting an optical ferrule comprising:
 mating one or more optical ferrule disposed within a housing of an optical connector respectively with one or more reflectors of an inspection device, each reflector including a mating surface and a mirror disposed at an oblique angle with respect to the mating surface, the mating of the optical ferrule with a reflector causing the mating surface of the reflector to contact a mating surface of the optical ferrule and causing the optical ferrule to rotate around a lateral axis perpendicular to a mating axis of the optical connector; and
 reflecting light from the mirror of the reflector, the reflected light providing a reflected view of at least a portion of the mating surface of the optical ferrule.

Item 29. The method of item 28, further comprising receiving the reflected light in an imaging system.

Item 30. The method of any of items 28 through 29, wherein receiving the reflected light in the imaging system comprises simultaneously receiving reflected light from multiple mirrors of multiple reflectors.

Item 31. The method of any of items 28 through 29, wherein receiving the reflected light comprises receiving the reflected light from each of multiple mirrors of multiple reflectors sequentially in time.

Item 32. The method of any of items 28 through 31, further comprising displaying the image received by the imaging system.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An inspection device comprising:
one or more reflectors, each reflector comprising:
a mating surface; and
a mirror disposed at an oblique angle with respect to the mating surface, wherein the reflector is configured to mate with an optical ferrule disposed within a housing of an optical connector such that the mating surface of the reflector is in contact with a mating surface of the optical ferrule and the mirror is positioned to provide a reflected view of at least a portion of a mating surface of the optical ferrule, the mating surface of the reflector configured to slidably engage with the mating surface of the optical ferrule.

2. The device of claim 1, wherein the reflected view includes a reflected view of an optical window disposed in the mating surface of the optical ferrule.

3. The device of claim 1, wherein the reflector includes a viewing surface spaced apart from the mirror, the viewing surface configured to transmit light reflected by the mirror.

4. The device of claim 3, wherein, between the mirror and the viewing surface, the reflector comprises a material that is substantially transparent to the light reflected by the mirror.

5. The device of claim 3, wherein the viewing surface is configured to refract the light reflected by the mirror.

6. The device of claim 3, wherein the viewing surface is angled such that the image of the mating surface can be viewed along a mating axis of the optical connector housing.

7. The device of claim 3, wherein the viewing surface is disposed at an oblique angle with respect to the mating surface such that the viewing surface refracts the light redirected by the mirror.

8. The device of claim 3 further comprising a tab extending from the reflector and configured to facilitate insertion of the inspection device into the optical connector and removal of the inspection device from the optical connector.

9. The device of claim 8, wherein the tab includes first and second tab extensions that respectively extend on either side of the viewing surface.

10. The device of claim 8, wherein the tab includes first and second tab extensions that respectively extend on either side of the mirror.

11. The device of claim 8, wherein the tab includes:
tab extensions that extend from the reflector; and
a tab end attached to the tab extensions.

12. The device of claim 1, wherein the reflector comprises at least one first alignment feature configured to engage with a second complementary alignment feature of the optical ferrule.

13. The device of claim 12, wherein:
the first alignment feature comprises a protrusion; and
the second complementary alignment feature comprises a receptacle.

14. The device of claim 12, wherein:
the first alignment feature comprises a receptacle; and
the second complementary alignment feature comprises a protrusion.

15. The device of claim 1, wherein the reflector includes one or more stop features configured to restrict movement of the reflector along a mating axis.

16. The device of claim 1, wherein the reflector includes left and right arms disposed respectively at left and right sides of the reflector, wherein the left and right arms are configured to restrict movement of the optical ferrule along a lateral axis perpendicular to a mating axis of the reflector and the optical ferrule.

17. The device of claim 1, wherein movement of the reflector is restricted along a lateral axis perpendicular to a mating axis of the reflector and the optical ferrule by arms of the optical ferrule.

18. The device of claim 17, wherein the arms include stop features configured to restrict movement of the reflector along the mating axis.

19. The device of claim 1, wherein the device includes multiple reflectors, each reflector configured to mate with a different optical ferrule disposed within the housing of the optical connector.

20. The device of claim 1, wherein the mirror is a total internal reflection (TIR) mirror.

21. The device of claim 1, wherein the mirror comprises at least one of:
a metallic coating;
an aluminum coating;
an interference coating;
a polished surface;
a cleaved surface;
a curved surface; and
an uncoated surface.

22. The device of claim 1, wherein the oblique angle between the mirror and the mating surface is in a range of about 30 degrees to about 60 degrees.

23. The device of claim 1, wherein the oblique angle between the mirror and the mating surface is about 45 degrees.

24. The device of claim 1, wherein the optical ferrule is attached to an optical cable and a bend in the optical cable provides a mating spring force that maintains the optical ferrule in a mating arrangement with the reflector.

25. An inspection system comprising:
an inspection device that includes one or more reflectors, each reflector comprising:
a mating surface; and
a mirror disposed at an oblique angle with respect to the mating surface, wherein the reflector is configured to mate with an optical ferrule disposed within a housing of an optical connector such that the mating surface of the reflector is in contact with a mating surface of the optical ferrule and the mirror is positioned to provide a reflected view of an output surface of the optical ferrule, the mating surface of the reflector configured to slidably engage with the mating surface of the optical ferrule; and
an imaging system configured to image the reflected view provided by the mirror of each reflector.

26. The inspection system of claim 25, wherein the imaging system is configured to simultaneously receive the light reflected by the mirrors of multiple reflectors.

27. The inspection system of claim 25, wherein the imaging system is configured to sequentially receive the light reflected by the mirrors of multiple reflectors.

* * * * *